Nov. 13, 1923.

V. DURAND, JR 1,473,814

RECEPTACLE

Filed Aug. 13, 1921

WITNESS
F. J. Hartman.

INVENTOR
Victor Durand, Jr.
BY
ATTORNEYS

Nov. 13, 1923.

V. DURAND, JR
RECEPTACLE
Filed Aug. 13, 1921

INVENTOR
Victor Durand, Jr.
BY
ATTORNEYS

WITNESS

Patented Nov. 13, 1923.

1,473,814

UNITED STATES PATENT OFFICE.

VICTOR DURAND, JR., OF VINELAND, NEW JERSEY.

RECEPTACLE.

Application filed August 13, 1921. Serial No. 491,915.

*To all whom it may concern:*

Be it known that I, VICTOR DURAND, Jr., a citizen of the United States, and a resident of Vineland, in the county of Cumberland, State of New Jersey, have invented certain new and useful Improvements in Receptacles, of which the following is a specification, reference being had to the accompanying drawings, forming a part thereof.

My invention relates to receptacles in which the inner container for the liquids or other substances is separated by a vacuum from an enclosing medium. Devices having these general characteristics are sometimes called thermos bottles which also embody metal covers.

Among the objects of my invention is to provide an improved receptacle such as a vacuum or thermos bottle, which is made substantially entirely of glass or other suitable material; which is provided with means minimizing the possibilities of breakage; which can be readily cleaned both exteriorly and interiorly; which may be produced cheaply; a receptacle provided with an insulating vacuum in which the disadvantage of having the liquid or a portion of it pass into the space between the metal cover and the glass casing as frequently happens in the devices now in use is avoided, the metal cover being dispensed with in my invention.

Other objects of my invention will appear in the specification and claims below.

Referring to the drawings forming a part of the specification and in which the same reference characters are used throughout the views to designate the same parts, I have illustrated some embodiments of my invention; Figure 1 is a vertical sectional view, part, however, being in elevation, showing the construction of a thermos bottle containing my invention;

Figure 1:
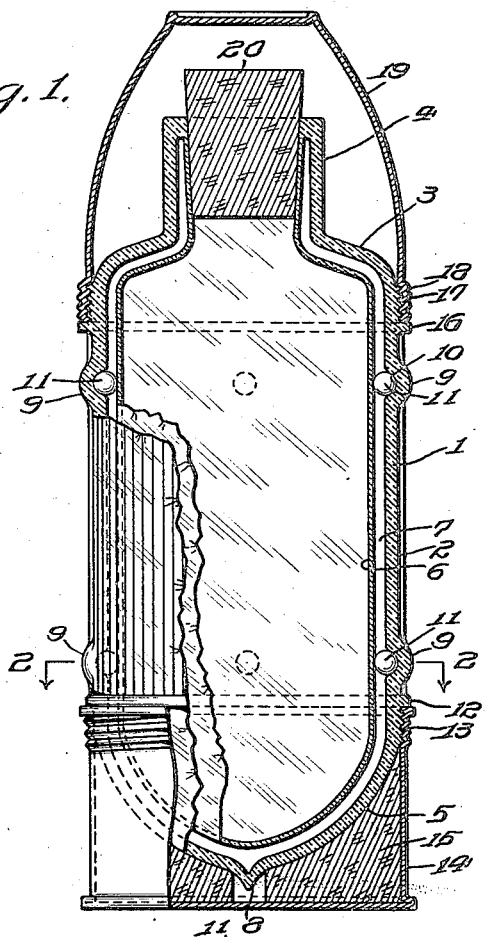
Figure 2:
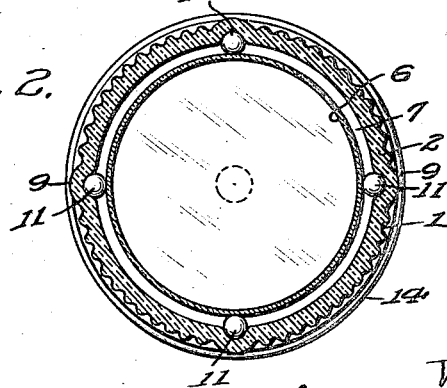
Fig. 2 is a horizontal section through the bottle taken on the line 2—2 of Fig. 1.

Referring first to Fig. 1, the bottle therein shown embodying my invention consists of a heavy outer casing 1 of glass or other suitable material, the main or body portion 2 of which is substantially cylindrical, and having a shoulder 3 and a neck 4. The lower part 5 of the glass outer casing 1, is preferably substantially spherical. The said bottle is also provided with a thin inner member or inner container 6 of glass or other suitable material, the walls of which are thin and the shape of this inner container substantially conforms to that of the outer casing. When the bottle is completed a space 7 is provided between the inner container 6 and the outer casing 1 throughout their entire extent except at the mouth of the bottle where they are rigidly integrally connected together.

In making the vacuum bottle, the outer casing is first made of substantially the same shape as that shown in Fig. 1 except that the body portion 2 is continuously cylindrical and is open throughout its entire diameter at the lower end thereof. The inner container or thin glass bottle 6 is formed by blowing in substantially the same shape as that shown in Fig. 1 and is then inserted through the large open bottom end of the casing 1 and the top of its neck or mouth is then fused to the inside of the neck or mouth 4 of the casing 1. After these have been joined, the open end of the casing 1 is then reheated and drawn or blown or shaped into substantially spherical form, as shown in Fig. 1. An exhaust opening is, of course, left at the tip 8 of the casing and before the air is exhausted from between the casing 1 and the inner container 6, the surfaces may be silvered in any ordinary and well known manner. Then the air is exhausted from between the parts 1 and 6 and when thoroughly exhausted, the tip 8 is sealed.

It should be noted that I preferably provide the outer casing 1 with a series of projections 9 forming between the inner container and the casing of the bottle recesses 10. In these recesses, spherical spheres, or balls of cork, rubber, or any other suitable yielding material may be forced before the end 5 of the outer container is closed. These cork or rubber balls 11 serve to steady and maintain the thin narrow bottle or container 6 within the outer casing and to prevent the neck of the inner container 6 from being broken when the bottle, as a whole, is subjected to a sudden shock, as, for instance, by dropping the bottle upon the floor.

Adjacent the lower spherical end 5 of the outer container, I preferably therein provide a rim or ring 12 and integral with the body of the outer container, and up to and against the shoulder formed by the said ring 12, I press or form or otherwise provide the upper parts of the spherical end 5 with screw threads 13 preferably formed in the glass itself. This provides a means for fastening a metal bottom 14 to the bottom of the outer glass casing 1. This bottom 14 is preferably cylindrical on its sides and is flat on its bottom, and may contain any suitable yielding material 15, such as cork, rubber or asbestos to bear against the outer spherical surface of the glass end 5. Preferably, this material 15 is provided with a hole or opening within which the tip 8 may be seated and kept out of contact with the metal.

I also preferably provide another ring or rim 16 adjacent the top of the outer casing or cover 1, and against the shoulder thereby formed and above the rim 16 I also press into the glass screw threads 17 over which may be threaded the threaded end 18 of a drinking cup 19 to be screwed down against said shoulder or ring 16 which also protects the neck 4 of the bottle when the same is being transported.

Between the rings or rims 12 and 16, I preferably provide the outer surface of the glass container or casing 1 with corrugations. In Figure 1, these corrugations are shown as vertical and they form a relatively roughened surface which may be readily grasped and by means of which the bottle may be securely held in the hand without fear of slipping. These ribs also serve to strengthen the outer glass cover or casing 1.

Figure 3:
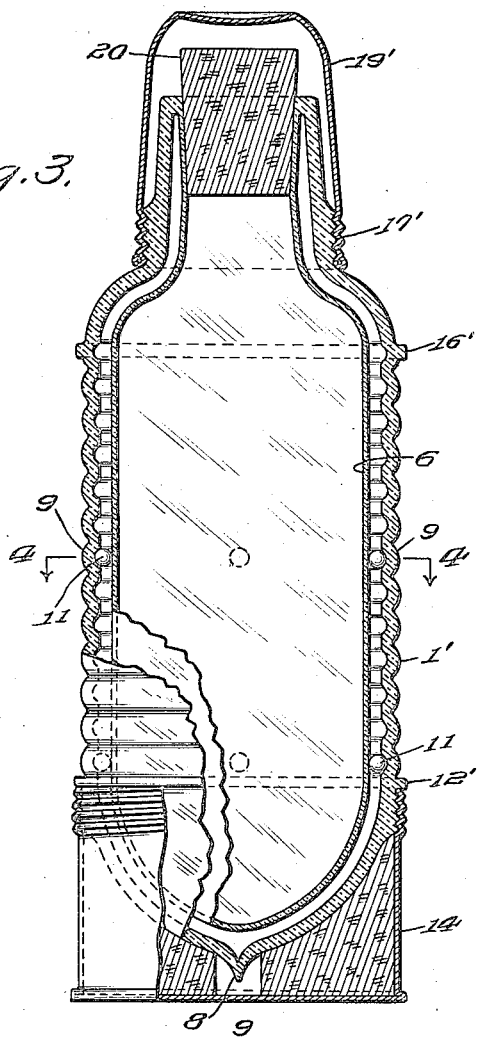
Fig. 3 is a modified form of my invention, the same being shown substantially in vertical cross-section, but with parts in elevation.
Figure 4:
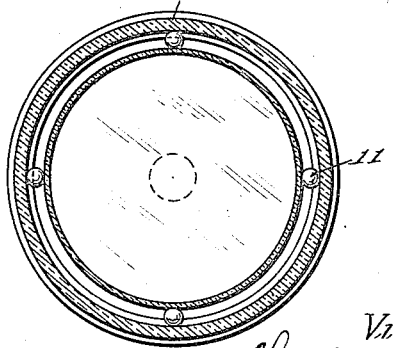
Fig. 4 is a horizontal sectional view taken on the line 4—4 of Fig. 3.

In Figs. 3 and 4, I have shown a modified form of my invention. In this modified form, the screw threads 17' are located on the neck of the bottle near the mouth of it; that is to say, near the upper end of the outer container, and the cup 19' is smaller than that shown in Fig. 1 and fits more closely around the top of the bottle. In this construction I also provide the upper ring or rib 16' and the lower ring or rib 12' as in the previous construction. Between these rings or ribs 12' and 16', the surface of the bottle is roughened in another manner; that is to say, there are provided circumferentially extending rings or ribs extending horizontally when the bottle is standing, as distinguished from vertical. In this form or construction, it is very easy to provide the interior of the outer casing 1' with a relatively roughened surface between the horizontal corrugations so that it is unnecessary to provide the outer casing in this construction with the semispherical protuberances 9 to provide recesses to retain pith or rubber balls or balls of other yielding material. In this construction a ball or small piece of rubber, cork or pith, or any other suitable material can be pushed along longitudinally of the bottle to a suitable position and when left it will be retained in that position by the horizontal corrugations on the inside of the outer casing 1''.

It is, of course, understood that the bottle may be provided with a stopper 20 of the ordinary construction and that any number of balls or small masses of springy material 11 may be suitably inserted between the two glass parts as may be found desirable. It will thus be observed I have made or provided a thermos bottle almost entirely of glass. In fact, it may be made entirely of glass, but for obvious reasons, I prefer to provide these bottles with a base 14 by means of which the same may be held in an upright position, instead of trying to make the base portion 5 of the bottle flat to provide a base upon which the bottle may be stood. In this construction the entire top and mouth of the bottle may be kept absolutely clean. There are no cracks, recesses or spaces which may become filled or which will retain any accumulations of foreign matter. The entire bottle may be washed and kept clean with a minimum amount of attention and care.

I have thus provided a receptacle which consists substantially entirely of a thin inner container portion 6 integrally united to an outer heavy glass casing 1 which casing 1 is made of such thickness and toughness and of such shape or configuration as to be very strong and to protect the thin inner casing from breakage to substantially the same degree as it is protected in those thermos bottles in which the whole outer casing is covered with metal. In this latter form of vacuum bottle there is a circumferential space between the neck of the outer glass casing and the metal cover and frequently, during the filling operation, some of the liquid passes therein which when the liquid is being dispensed, mingles undesirably with the liquid from the inner container. In my improved vacuum bottle there is no such corresponding circumferential space or passage so that said undesirable mingling of the liquid is avoided.

It will also be noted that inasmuch as the whole or substantially the whole of the exterior of my improved receptacle is of glass it may be kept clean much more easily than those forms of receptacles having metal covers.

While I have herein shown and described with some particularity certain embodiments of my invention, I do not thereby desire or intend to limit myself specifically thereto, as suitable changes and modifications may be made in the details of construction and arrangement of the various parts without departing from the spirit and scope of the invention as defined in the appended claims.

Having thus described my invention, what I claim and desire to protect by Letters Patent is:

1. A vacuum receptacle made substantially entirely of glass and comprising an inner container of relatively thin glass, a relatively heavy or thick outer casing of glass, surrounding and substantially enclosing said inner container, integrally connected therewith at the mouth of said inner container and elsewhere spaced from said inner container to form a vacuum chamber between said inner container and said outer casing and surrounding said inner container, and a closure for the mouth of said inner container, said outer glass casing being strong enough to substantially withstand the usage to which metal-covered vacuum receptacles are subjected.

2. A vacuum receptacle made substantially entirely of glass and comprising an inner container of relatively thin glass, a relatively heavy or thick outer casing of glass, surrounding and substantially enclosing said inner container, integrally connected therewith at the mouth of said inner container and elsewhere spaced from said inner container to form a vacuum chamber between said inner container and said outer casing and surrounding said inner container, and a closure for the mouth of said inner container, said outer glass casing being provided throughout the major portion of its surface with a series of strengthening ribs integral therewith whereby said outer glass casing is made strong enough to substantially withstand the usage to which metal-covered vacuum receptacles are subjected.

3. A vacuum receptacle made substantially entirely of glass and comprising a relatively thin inner container of glass, a relatively heavy outer glass casing enclosing and substantially surrounding said inner casing and integrally connected thereto at the mouth of said inner container and elsewhere separated therefrom to form a vacuum chamber between said container and said casing and surrounding said container, said outer casing being provided with integral screw threads pressed therein adjacent the mouth end of said casing, a stopper to close the mouth of said container, and a cap, the mouth of which is provided with screw threads adapted to fit said threads on said outer casing, to cover and enclose the mouth end of said casing and to protect the same.

4. A vacuum receptacle made substantially entirely of glass and comprising a relatively thin inner container of glass, a relatively heavy outer glass casing enclosing and substantially surrounding said inner casing and integrally connected thereto at the mouth of said inner container and elsewhere separated therefrom to form a vacuum chamber between said container and said casing and surrounding said container, said outer casing being provided with integral screw threads pressed therein adjacent the mouth end of said casing, a stopper to close the mouth of said container, a cap, the mouth of which is provided with screw threads adapted to fit said threads on said outer casing, to cover and enclose the mouth end of said casing and to protect the same, and a metal base secured to the opposite end of said casing.

5. A vacuum receptacle made substantially entirely of glass and comprising a relatively thin inner container of glass, a relatively heavy outer glass casing enclosing and substantially surrounding said inner casing and integrally connected thereto at the mouth of said inner casing and elsewhere spaced therefrom to form a vacuum chamber between said container and said casing and surrounding said container, said outer casing being provided with integral screw threads pressed therein adjacent the mouth end of said casing, a stopper to close the mouth of said container, a metal cup, the mouth of which is provided with screw threads adapted to fit said threads on said outer casing to cover and enclose the mouth end of said casing to protect the same, said outer casing being also provided with screw threads pressed therein near the bottom end thereof, and a metal base having a flat bottom and having screw threads adapted to fit said screw threads near the bottom end of said casing to enclose the bottom end of said casing.

6. A vacuum receptacle made substantially entirely of glass and comprising a relatively thin inner container of glass, a relatively heavy outer glass casing enclosing and substantially surrounding said inner casing and integrally connected thereto at the mouth of said inner casing and elsewhere spaced therefrom to form a vacuum chamber between said container and said casing and surrounding said container, said outer casing being provided with integral screw threads pressed therein adjacent the mouth end of said casing, a stopper to close the mouth of said container, a metal cup, the mouth of which is provided with screw threads adapted to fit said threads on said outer casing to cover and enclose the mouth end of said casing to protect the same, said outer casing being also provided with screw threads pressed therein near the bottom end thereof, and a metal base having a flat bottom and having screw threads adapted to fit said screw threads near the bottom end of said casing to enclose the bottom end of said casing, said casing being provided between said screw threads with a series of integral ribs to render said outer casing strong enough to withstand the usage to which metal-covered vacuum receptacles are subjected.

In witness whereof, I have hereunto set my hand this 12th day of August, 1921.

VICTOR DURAND, Jr.